US008984447B2

(12) United States Patent
Rodgers

(10) Patent No.: US 8,984,447 B2
(45) Date of Patent: Mar. 17, 2015

(54) COMPREHENSIBILITY OF FLOWCHARTS

(75) Inventor: Michael P. Rodgers, Aurora, CO (US)

(73) Assignee: Oracle International Corporation, Redwood Shores, CA (US)

(*) Notice: Subject to any disclaimer, the term of this patent is extended or adjusted under 35 U.S.C. 154(b) by 885 days.

(21) Appl. No.: 13/045,887

(22) Filed: Mar. 11, 2011

(65) Prior Publication Data
US 2012/0233562 A1 Sep. 13, 2012

(51) Int. Cl.
G06F 3/048 (2013.01)
G06T 11/20 (2006.01)

(52) U.S. Cl.
CPC ................................. G06T 11/206 (2013.01)
USPC ............ 715/853; 715/768; 715/821; 345/440

(58) Field of Classification Search
USPC .................. 715/768, 821, 853, 854; 345/440
See application file for complete search history.

(56) References Cited

U.S. PATENT DOCUMENTS

| | | | |
|---|---|---|---|
| 5,428,550 A * | 6/1995 | Covey et al. ................... | 716/103 |
| 6,646,652 B2 * | 11/2003 | Card et al. ..................... | 345/645 |
| 6,765,597 B2 | 7/2004 | Barksdale et al. | |
| 6,888,554 B1 * | 5/2005 | Decombe ....................... | 345/645 |
| 6,897,885 B1 | 5/2005 | Hao et al. | |
| 7,302,676 B2 | 11/2007 | Schmitt et al. | |
| 7,310,784 B1 | 12/2007 | Gottlieb et al. | |
| 7,428,705 B2 * | 9/2008 | Ronald et al. .................. | 715/738 |
| 7,506,274 B2 | 3/2009 | Zhang et al. | |
| 7,536,650 B1 * | 5/2009 | Robertson et al. ............. | 715/767 |
| 7,548,238 B2 | 6/2009 | Berteig et al. | |
| 7,565,190 B2 | 7/2009 | Okerlund et al. | |
| 7,657,848 B2 * | 2/2010 | Yakowenko et al. .......... | 715/853 |
| 7,661,069 B2 * | 2/2010 | Lindsay et al. ................ | 715/767 |
| 7,752,110 B1 | 7/2010 | Swearingen et al. | |
| 7,755,628 B2 | 7/2010 | Reshetov et al. | |
| 7,956,869 B1 * | 6/2011 | Gilra .............................. | 345/592 |
| 8,312,389 B2 * | 11/2012 | Crawford et al. .............. | 715/854 |
| 8,456,477 B2 * | 6/2013 | Ishioka .......................... | 345/501 |
| 8,499,284 B2 * | 7/2013 | Pich et al. ...................... | 717/120 |
| 8,584,046 B2 * | 11/2013 | Lee et al. ....................... | 715/854 |
| 2005/0086238 A1 * | 4/2005 | Nevin ............................ | 707/100 |

(Continued)

FOREIGN PATENT DOCUMENTS

WO 2007079361 A2 7/2007

OTHER PUBLICATIONS

Author Unknown, Flowchart & Flowcharting & Flow Chart, FateSoft, http://www.fatesoft.com/s2f/?gclid=CKqW1r_J6KQCFcFR6wod9W4Gzw, Oct. 19, 2010, 3 pages.

(Continued)

Primary Examiner — Nicholas Ulrich
(74) Attorney, Agent, or Firm — Kilpatrick Townsend & Stockton LLP

(57) ABSTRACT

Various arrangements for simplifying a display of a flowchart are presented. A flowchart may include a plurality of elements, including a plurality of vertices and a plurality of edges. A selection of an element of the plurality of elements may be received. A logical distance for each element of the plurality of elements may be calculated. The logical distance may be between each element and the element identified by the selection. The flowchart may be displayed with a portion of the plurality of elements emphasized. The portion of the plurality of elements emphasized are selected at least partially based on the logical distance of each element of the plurality of elements.

17 Claims, 8 Drawing Sheets

(56) References Cited

U.S. PATENT DOCUMENTS

| | | | |
|---|---|---|---|
| 2008/0065977 A1* | 3/2008 | Gottlieb et al. | 715/203 |
| 2008/0168357 A1* | 7/2008 | Firebaugh et al. | 715/737 |
| 2009/0064053 A1* | 3/2009 | Crawford et al. | 715/854 |
| 2009/0187864 A1* | 7/2009 | Bedell et al. | 715/854 |
| 2009/0231339 A1 | 9/2009 | Smith et al. | |
| 2009/0271737 A1* | 10/2009 | Borkar et al. | 715/821 |
| 2011/0202846 A1* | 8/2011 | Najork et al. | 715/736 |

OTHER PUBLICATIONS

Author Unknown, SmartShape Tutorial: Fading Trees, Visio Guy, http://www.visguy.com/2007/12/03/smartshape-tutorial-fading-trees/, Dec. 3, 2007, 14 pages.

Williams, M. H., "A Comment on the Decomposition of Flowchart Schemata," The Computer Journal, 1982, pp. 393-396, vol. 25 No. 3.

* cited by examiner

COMPREHENSIBILITY OF FLOWCHARTS

BACKGROUND

The present invention relates, in general, to displaying information graphically and, in particular, to increasing the comprehensibility of flowcharts.

Visual representations of data can be useful to help persons understand the underlying information. For example, computer software exists for producing flowcharts from computer code. Such software allows for a programmer, or some other person, to see a visual representation of the computer code. Just as computer code can be complex, a graphical representation of computer code can be similarly complex. Visual representations of information besides computer code may also be complex and hard to decipher.

For example, FIG. 1 illustrates an example of a fairly complex flowchart. Flowchart 100 represents the workflow of an information systems help desk. Flowcharts with similar or a greater level of complexity may require a user to follow arrows (or other indicators) carefully in order to determine what step or steps follow or precede a step. Further, computer-generated visual representations of data, such as computer-generated flowcharts, may not be organized efficiently. For example, a computer-generated flowchart may have a number of overlapping lines. Such an arrangement may result in a person having to carefully trace lines (such as by following the line with a finger) in order to determine the following or preceding steps.

SUMMARY

In some embodiments, a method for simplifying a display of a flowchart is presented. The method may include receiving, by a computer system, the flowchart. The flowchart may comprise a plurality of elements. The plurality of elements may comprise a plurality of vertices and a plurality of edges. The method may include receiving, by the computer system, a selection of an element of the plurality of elements. The method may also include calculating, by the computer system, a logical distance for each element of the plurality of elements. The logical distance for each element of the plurality of elements may be between each element and the element of the selection. The method may include displaying, by the computer system, the flowchart with some of the plurality of elements emphasized. The portion of the plurality of elements emphasized may be selected at least partially based on the logical distances of the plurality of elements.

In some embodiments, displaying the flowchart with some of the plurality of elements emphasized further comprises: at least partially based on the logical distance for each element of the plurality of elements, setting an opacity for the corresponding element, wherein opacity decreases as logical distance increases from the element identified by the selection. Displaying the flowchart with the portion of the plurality of elements emphasized may further comprise: elements having logical distances greater than a threshold logical distance that are set to a minimum threshold opacity. In some embodiments, the method further comprises: before receiving the selection of the element of the plurality of elements, displaying, by the computer system, the flowchart with equal emphasis on each of the plurality of elements. Receiving the selection of the element of the plurality of elements may comprise receiving the selection of a vertex from a user. Receiving the selection of the element of the plurality of elements may comprise receiving the selection of an edge from a user. In some embodiments, calculating the logical distance for each element of the plurality of elements comprises: determining a shortest logical distance between each element and the element identified by the selection; identifying a number of elements between each element and the element identified by the selection along the shortest logical distance; and adding the number of elements between each element and the element identified by the selection along the shortest logical distance to calculate the logical distance.

In some embodiments, a computer program product residing on a processor-readable memory and comprising processor-readable instructions is presented. The processor-readable instructions may be configured to cause a processor to receive a flowchart. The flowchart may comprise a plurality of elements. The plurality of elements may comprise a plurality of vertices and a plurality of edges. The processor-readable instructions may include instructions configured to cause the processor to receive a selection of an element of the plurality of elements. The processor-readable instructions may include instructions configured to cause the processor to calculate a logical distance for each element of the plurality of elements. The logical distance for each element of the plurality of elements may be between each element and the element of the selection. The processor-readable instructions may include instructions configured to cause the processor to cause the flowchart to be displayed with some of the plurality of elements emphasized. The portion of the plurality of elements emphasized may be selected at least partially based on the logical distances of the plurality of elements.

In some embodiments, a system for simplifying a display of a flowchart is presented. The system may include a processor. The system may also include a memory communicatively coupled with and readable by the processor and having stored therein a series of instructions. The instructions, when executed by the processor, may cause the processor to receive the flowchart. The flowchart may comprise a plurality of elements. The plurality of elements may comprise a plurality of vertices and a plurality of edges. The instructions, when executed by the processor, may also cause the processor to receive a selection of an element of the plurality of elements. The instructions, when executed by the processor, may further cause the processor to calculate a logical distance for each element of the plurality of elements. The logical distance may be between each element and the element of the selection. The instructions, when executed by the processor, may cause the processor to cause the flowchart to be displayed with some of the plurality of elements emphasized. The portion of the plurality of elements emphasized may be selected at least partially based on the logical distances of the plurality of elements.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In order to make a graphical representation of information, such as a flowchart, more easily understood by a user, the display of the flowchart may be adjusted to make the flowchart more comprehensible. When a user is inspecting a flowchart, typically, the user's attention is directed to only a particular portion of the flowchart at a given instant. In such a situation, the user may be interested in one or more elements leading to a particular element and one or more elements following the particular element. In order to make this portion of the flowchart more comprehensible, the user may be permitted to select an element of the flowchart. Based on the user's selection, the display of elements of the flowchart may be adjusted.

Elements of the flowchart closest to the element selected by the user may be emphasized, while elements of the flowchart farther from the element selected by the user may be deemphasized. One way of emphasizing and deemphasizing elements of the flowchart may be to adjust the opacity of elements. To emphasize elements closely connected with the element selected by the user, the opacity of these elements may be set high. Elements not closely connected with the element selected by the user may be deemphasized by having a lower opacity. In some embodiments, as the logical distance from the element selected by the user increases, the opacity decreases. More specifically, as the logical distance from the element selected by a user increases, the opacity of elements may linearly or exponentially decrease. Once a certain logical distance is reached from the element selected by the user, elements may have a minimum opacity such that the elements are deemphasized but are still visible to the user.

At a later time, the user may select some other element of the flowchart. The emphasis and de-emphasis of the elements of the flowcharts may be reevaluated such that the elements emphasized and deemphasized are adjusted. As such, elements closely connected to the newly selected element may be more opaque, while elements not as closely connected with the newly selected element may be less opaque.

By having certain elements of the flowchart emphasized and other elements deemphasized, it may be easier for a user to quickly determine which elements are related and which elements are not immediately connected with the element selected by the user. As such, a user may be able to gain an understanding of the flowchart more easily than if all elements were always equally emphasized.

Figure 1:
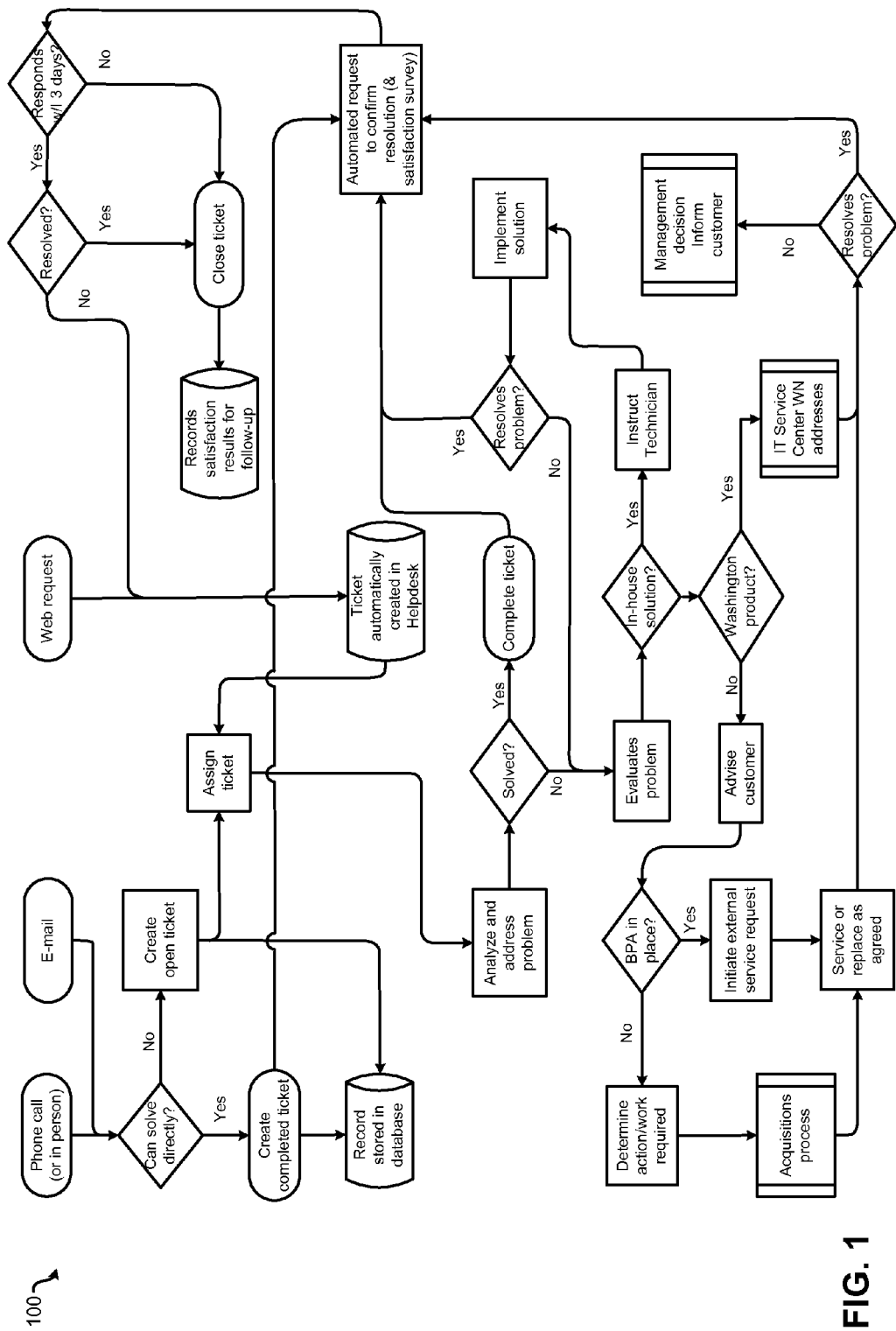
FIG. 1 illustrates an example of a flowchart.
Figure 2:
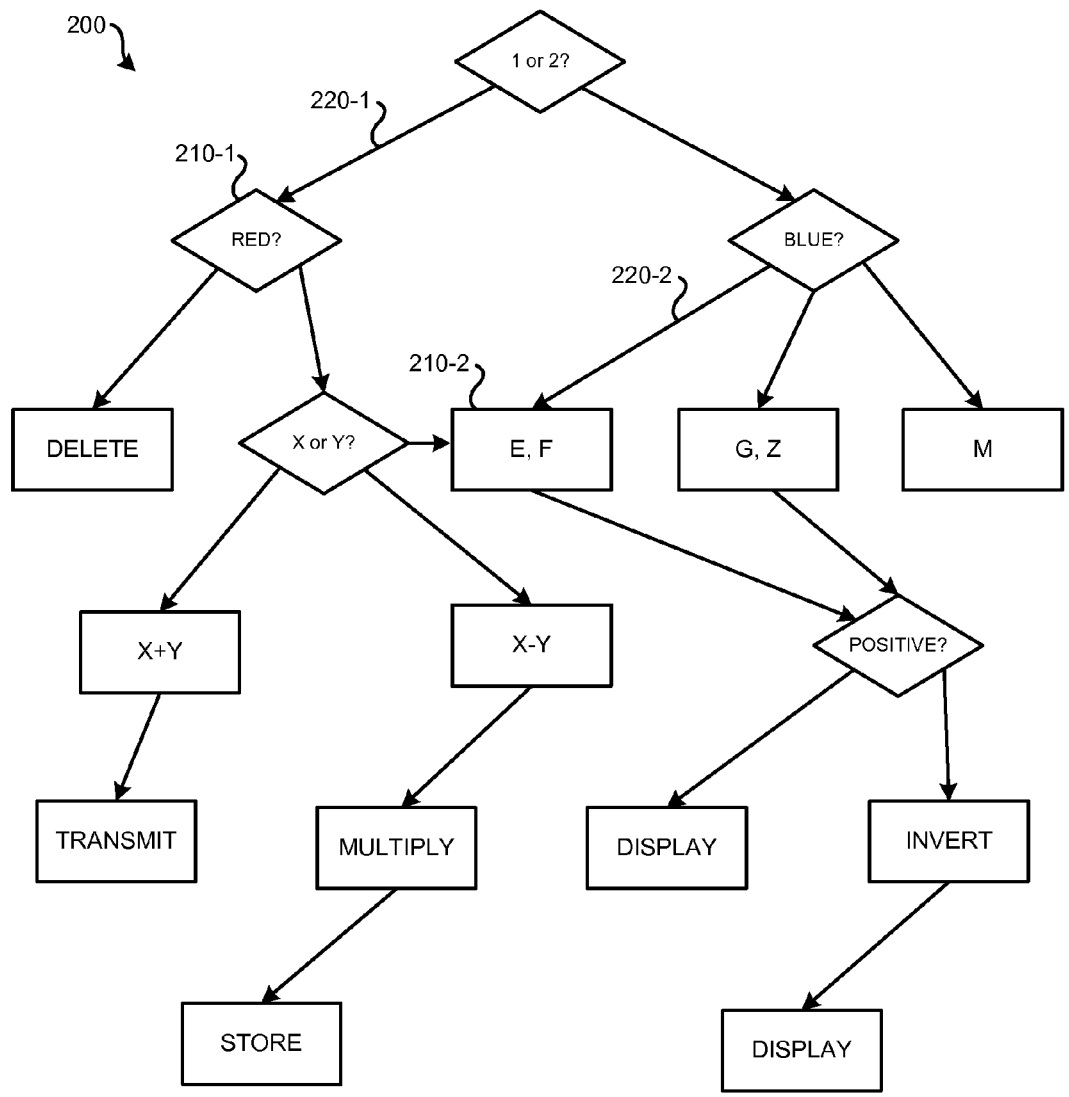
FIG. 2 illustrates an embodiment of a flowchart.

FIG. 2 illustrates an embodiment of a flowchart 200. Flowchart 200 may represent a human-generated or a computer-generated flowchart. As an example, flowchart 200 may be computer-generated. Such a flowchart may provide a programmer or other user with a visual representation of computer code. Flowchart 200 may contain two types of elements: vertices and edges. A vertex represents a node of flowchart 200 and represents when a step is performed and/or a decision is made. Vertices 210 are examples of vertices. An edge is defined by a pair of points. Each of these points may be a vertex. As such, an edge may be represented by a line, or some other form of connector, that links two vertices. For example, edges 220 are examples of edges. The text of the elements of flowchart 200 does not represent an actual process but rather is provided for example purposes only.

Upon inspection by a user, flowchart 200 (or some other flowchart, such as a more complex flowchart) may be difficult for a user to quickly decipher. For example, it may be difficult for a user to quickly identify how a particular element, such as a vertex, is related with other elements, such as some other vertex. Flowchart 200 depicts each element with equal emphasis. For example, this may mean that each element has a similar or the same opacity. If a user is interested in a particular element of flowchart 200, the user may be permitted to select that element, such as by using a cursor.

Figure 3:
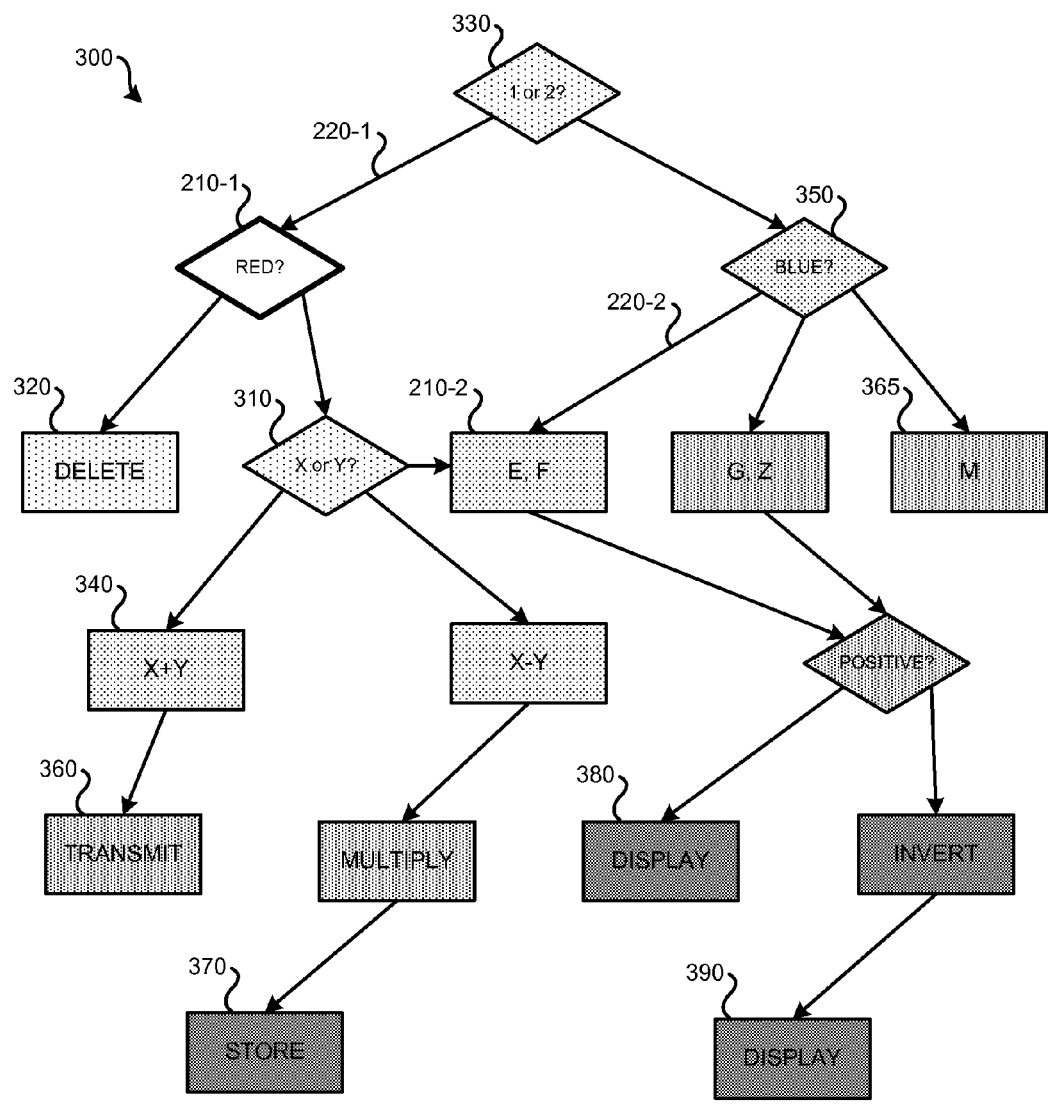
FIG. 3 illustrates an embodiment of a flowchart with modified element opacity.

FIG. 3 illustrates an embodiment of a flowchart with adjusted element opacity to reflect a portion of flowchart 300 being emphasized based on the selection of an element by a user. Flowchart 300 represents flowchart 200 of FIG. 2 with the opacity of vertices modified. In order to illustrate opacity in the attached figures, varying dot patterns of vertices have been used to represent different opacity levels.

In flowchart 300, a user has selected vertex 210-1. As such, to emphasize vertex 210-1 compared to other elements, the opacity of vertex 210-1 may be set to 100% or near 100%. For other elements, a logical distance from selected vertex 210-1 may be determined. Based on this logical distance, a level of opacity may be determined. Two vertices connected by an edge, such as vertex 210-1 and vertex 330 that are connected by edge 220-1 may be referred to as a logical distance of 1. Edge 220-1 may be referred to as a logical distance of 0.5 from selected vertex 210-1. Similarly, vertex 350 may be considered a logical distance of 2 from selected vertex 210-1.

Some elements, such as vertex 210-2 and edge 220-2 may have more than one path to selected vertex 210-1. Referring to vertex 210-2, vertex 210-2 is connected with selected vertex 210-1 via vertex 310. Vertex 210-2 is also connected with selected vertex 210-1 via vertex 350 and vertex 330. The former route has a logical distance of 2, while the latter route has a logical distance of 3. In some embodiments, the shorter route may be used to determine the opacity of an element. In other embodiments, the mean, median, or longer route may be used to determine the opacity of the element.

Vertices 310, 320, and 330 are each located a logical distance of 1 from selected vertex 210-1. As such, vertices and edge 310, 320, and 330 each have the same level of opacity. As an example, the opacity of vertices 310, 320, and 330 may be 80%. This 80% opacity level is represented in FIG. 3 by a sparse dot pattern. In some embodiments, even if the logical distance between an element and the selected element is the same, the opacity may vary depending on whether the element is a parent or child of the selected element. Vertices 340, 210-2, and 350 are each located a logical distance of 2 from selected vertices 210-1. As such, vertices 340, 210-2, and 350 each have the same level of opacity. As an example, the opacity of these vertices is 60%. This 60% opacity level is represented in FIG. 3 by a dot pattern less sparse than the 80% dot pattern. In some embodiments, sibling elements (e.g., children elements of the same parent element) may have different levels of emphasis. For example, a sibling of a selected element may not be emphasized. Vertices 360 and 365 are each located a logical distance of 3 from selected vertex 210-1. As such, these vertices also have the same opacity. As an example, vertices 360 and 365 have an opacity level of 40%. This 40% opacity level is represented in FIG. 3 by a dense dot pattern. Vertex 210-2 is also located a logical distance of 3 from selected vertex 210-1 via vertex 350 and vertex 330. However, because the path from vertex 210-2 to vertex 210-1 via vertex 310 is shorter, the opacity level of vertex 210-2 has been set to 60%. In some embodiments, an element may be assigned an opacity associated with the logical distance of the longest path to the selected element.

Vertices 370 and 380 are each located a logical distance of 4 from selected vertex 210-1. As such, these vertices also have the same opacity. As an example, vertices 370 and 380 have opacity of 20%. This 20% opacity level is represented in FIG. 3 by a very dense dot pattern. If the varying opacity levels are used to emphasize and deemphasize elements of a flowchart, below a certain opacity level it may be difficult to discern the presence of an element of the flowchart. As such, a minimum threshold opacity level may be used. As such, elements a certain or greater logical distance away from the selected element may have the same minimum threshold opacity level. In flowchart 300, this minimum threshold opacity level is 20%. As such, vertex 390, which is a logical distance of 5 from selected vertex 210-1, has the same opacity level as vertex 380 which is a logical distance of 4 from selected vertex 210-1. In some embodiments, a minimum opacity threshold value of 18% for elements a logical distance of 5 or farther from the selected element is used.

In flowchart 300, all edges, including edges 220-1 and 220-2, are illustrated as having the same emphasis (and, thus, the same opacity level). However, edges may have varying emphasis (e.g., opacity levels) similar to vertices. The logical distance of an edge ($d_e$) may be mathematically described according to equation 1: wherein $d_1$ is the logical distance to the selected element of one vertex with which the edge is linked and $d_2$ is the logical distance to the selected element of the other vertex with which the edge is linked.

$$d_e = 0.5 + \min(d_1, d_2) \quad \text{Eq. 1}$$

For example, edge 220-1 is located a logical distance of 0.5 from vertex 210-1. As such, edge 220-1 may have a opacity corresponding to this logical distance, such as 90%. Edge 220-2, which is a logical distance of 2.5 from selected vertex 210-1 (regardless of whether the path via vertex 310 or via vertex 330 is used), may have an opacity level of 50%. In some embodiments, edges may have the same opacity level as one of the vertices to which it pairs.

To represent opacity on an electronically displayed flowchart, various colors may be used. For example, an element, such as an edge or a vertex, that would be bright red when 100% opaque may be displayed using pink or a lighter shade of red, to represent the elements with a lower opacity. As the opacity decreases, the shade of color of the element may become lighter.

In some embodiments, as the logical distance increases from the selected vertex, the opacity of elements may decrease linearly. For example, referring to flowchart 300, each increase in logical distance of one from selected vertex 210-1 results in a 20% decrease in opacity until the minimum threshold opacity is reached. However, in some embodiments, it should be understood that opacity may vary as logical distance increases according to some other formula. For example, opacity may decrease exponentially as logical distance increases.

In flowchart 300, the opacity of elements is varied in order to increase the emphasis on elements near selected vertex 210-1 and decrease the emphasis on elements farther from selected vertex 210-1. Other ways of emphasizing and deemphasizing elements may also be possible. For example, varying colors may be used: elements near selected vertex 210-1 may be displayed in bright green, and elements a short logical distance away from selected vertex 210-1 may appear yellow, while elements even a further logical distance away from selected vertex 210-1 may appear red. In another example of a way various elements may be emphasized and deemphasized, the thickness of an outline of the elements may be varied. In flowchart 300, selected vertex 210-1 is shown with a bold outline. Rather than using opacity, the thickness of the outline of elements may be decreased as logical distance from selected vertex 210-1 increases. As another example, elements within a certain logical distance from selected vertices 210-1 may be displayed, while elements outside of this logical distance from selected vertex 210-1 may be hidden. Of course, other ways of emphasizing particular elements and deemphasizing other elements may also be possible.

In flowchart 300, a user selected vertex 210-1. It may be possible for user to select an edge. If an edge is selected, the determination of opacity for elements may be similar as if a vertex had been selected. For example, if the user selected edge 220-1, vertex 330 may be a logical distance of 0.5 from edge 220-1. Edge 220-2 may be a logical distance of 2 (via vertex 330) from edge 220-1.

Figure 4:
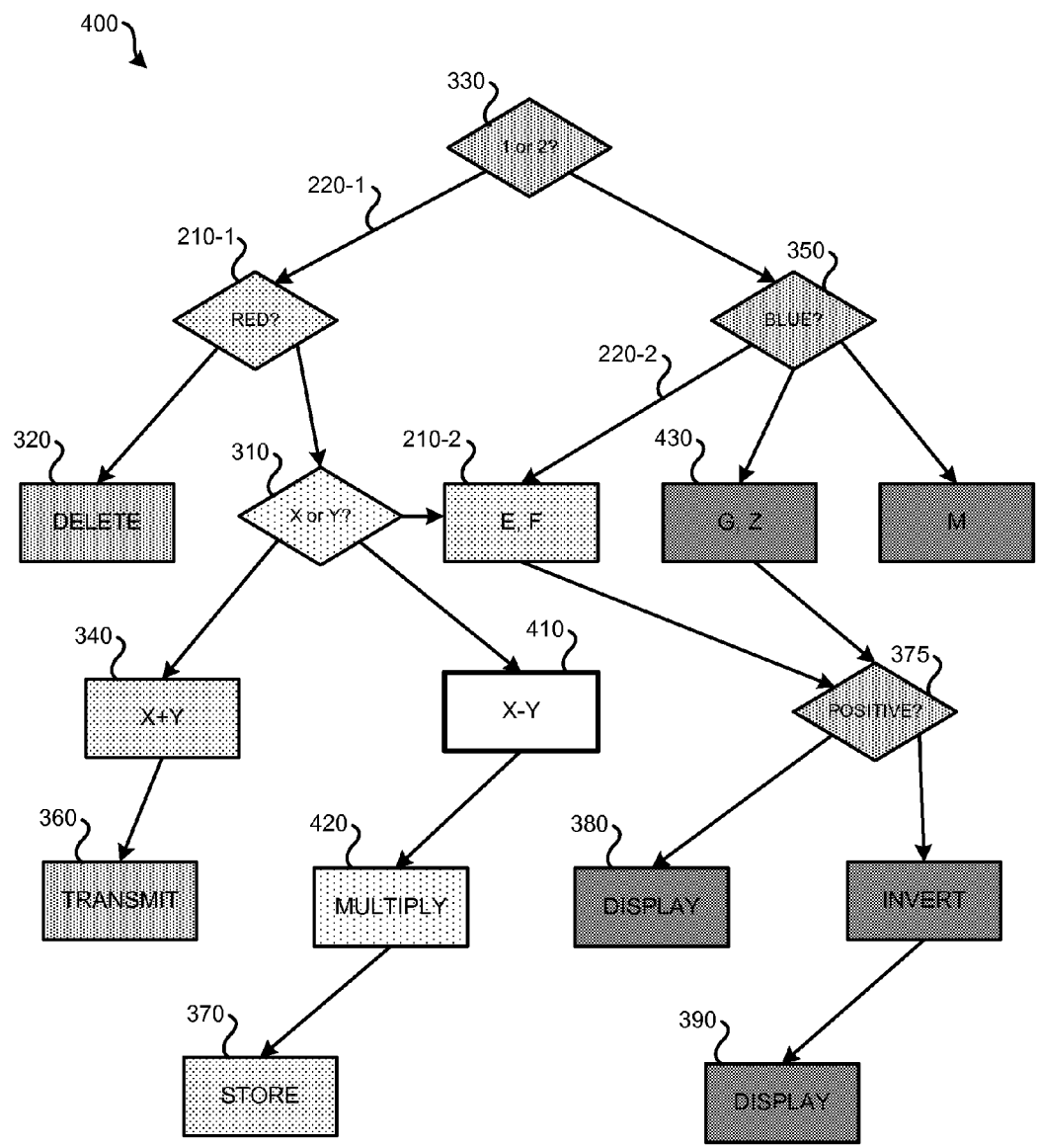
FIG. 4 illustrates another embodiment of a flowchart with modified element opacity.

FIG. 4 illustrates another embodiment of a flowchart with adjusted vertex opacity to reflect a portion of flowchart 400 being emphasized based on the selection of an element by a user. Flowchart 400 represents flowchart 200 of FIG. 2 and flowchart 300 of FIG. 3 with the opacity of vertices modified. In order to illustrate opacity in the attached figures, varying dot patterns of vertices have been used to represent different opacity levels.

In flowchart 400, a user has selected vertex 410. The selection of vertex 410 may occur when the flowchart 400 has each element equally emphasized, such as in flowchart 200 of FIG. 2, or when flowchart 400 has another element selected, such as flowchart 300 of FIG. 3.

In flowchart 400, a user has selected vertex 410. As such, vertex 410 may have a bold outline with 100% opacity. Elements located a logical distance of 1 from vertex 410 have an opacity of 80% (and are thus illustrated with a sparse dot pattern). These vertices are vertex 310 and vertex 420. The vertices 370, 340, 210-1, and 210-2 are located a logical distance of 2 from selected vertex 410. As such, each of these vertices have an opacity of 60%. This 60% opacity level is represented in FIG. 4 by a dot pattern less sparse than the 80% dot pattern. Vertices 360, 320, 330, 350, and 375 are each located a logical distance of 3 from selected vertex 410. As such, they have an opacity of 40%. This 40% opacity level is represented in FIG. 4 by a dense dot pattern. Vertices 380 and 430 are each located a logical distance of 4 from selected vertex 410. As such, they have an opacity of 20%. This 20% opacity level is represented in FIG. 4 by a very dense dot pattern. In flowchart 400, the minimum threshold opacity is 20%. As such, elements located a logical distance of greater than four from selected vertex 410 may be displayed with an opacity of 20%.

As in flowchart 300, each edge of flowchart 400 has 100% opacity. However, the opacity of edges may be varied to emphasize and deemphasize portions of flowchart 400 similar to how the opacity of vertices is varied in flowchart 400. As such, the opacity of vertices and edges may be varied at the same time or at separate times.

Figure 5:
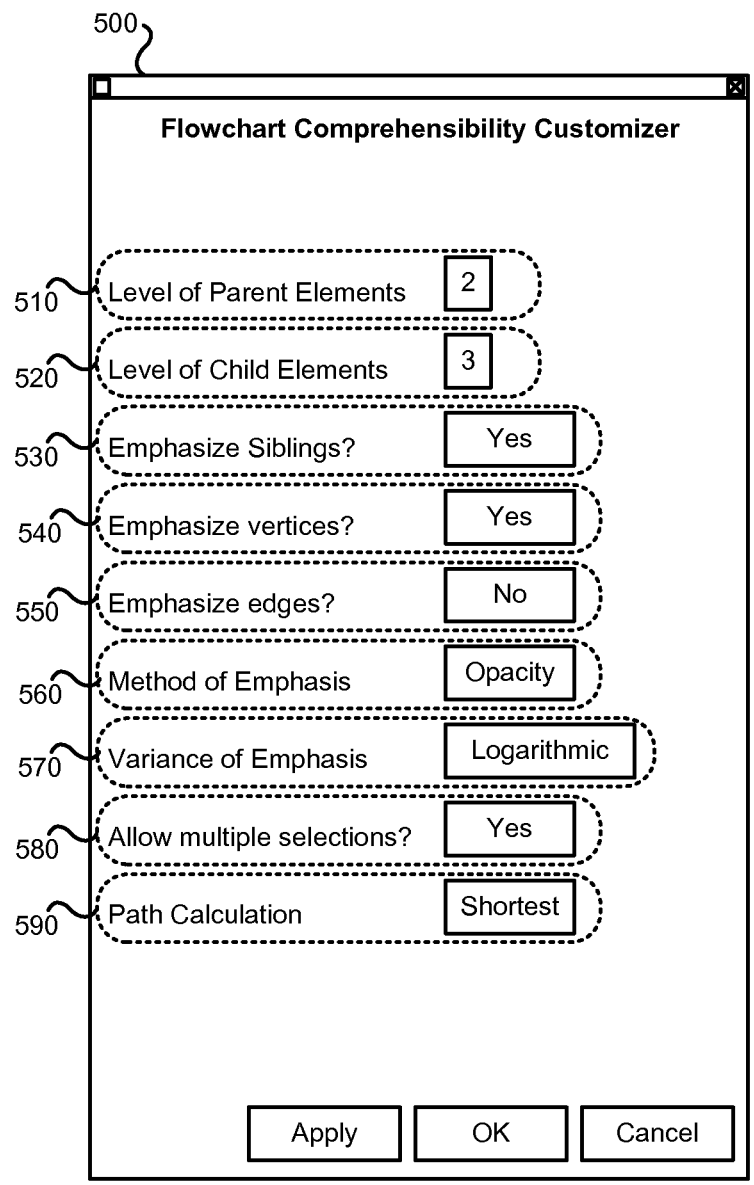
FIG. 5 illustrates an embodiment of a configuration panel for allowing a user to customize the display of a flowchart.

FIG. 5 illustrates an embodiment of a configuration utility 500 that allows a user to customize the display of a flowchart. Configuration utility 500 may be used to customize the display of a flowchart, such as flowcharts 200, 300, or 400 of FIGS. 2, 3, and 4, respectively. For example, a user may provide input to configuration utility 500. The display of a flowchart may be created in accordance with the user's input to configuration utility 500.

Option 510 may allow a user to specify a number of levels of parent elements that are emphasized. This may refer to the number of levels of preceding elements before a selected element that are emphasized. For example, a selection of "2" may refer to two levels of elements (e.g., an edge and a vertex) being emphasized (such as by having greater than the minimum threshold opacity) before a selected element.

Option 520 may allow a user to specify a number of levels of child elements that are emphasized. This may refer to the number of levels of subsequent elements following a selected element that are emphasized. For example, a selection of "3" may refer to three levels of elements (e.g., two edges and a vertex) being emphasized (such as by having greater than the minimum threshold opacity) after a selected element.

Option 530 may allow a user to specify if siblings of a selected element are emphasized. Siblings may refer to corresponding elements in different branches from the same parent. For example, referring to FIG. 4, vertex 210-2 is a sibling of vertex 430. If siblings are not to be emphasized, even though the sibling may be less than a certain number of elements away from the selected element, the sibling may not be emphasized.

Option 540 may allow a user to specify if vertices are to be emphasized. If yes, vertices may be emphasized and deemphasized. If not, all vertices may be displayed with the same emphasis, such as 100% opacity or the minimum threshold opacity. Similarly, option 550 may allow a user to specify if edges are to be emphasized. If yes, edges may be emphasized and deemphasized. If not, all edges may be displayed with the same emphasis, such as 100% opacity (as illustrated in FIGS. 3 and 4) or the minimum threshold opacity. Vertices may or may not be emphasized or deemphasized at the same time as edges.

Option 560 may allow a user to specify the method of emphasis and de-emphasis. Opacity may be one possible way of emphasizing (such as by having a high level of opacity) and deemphasized (such as by having a low level of opacity) various elements of a flowchart. Other possible ways of emphasizing and deemphasizing elements of a flowchart may involve: varying the size of elements (large are emphasized, small are deemphasized), varying the color (certain colors pertain to different levels of emphasis), varying font size and/or font within elements, varying the thickness of borders of elements (the thicker the border, the more emphasis on the element), and hiding elements (only display elements that are emphasized, hide others). Those with skill in the art will recognize that other possible ways for emphasizing some elements while deemphasizing other elements exist.

Option 570 may allow for a user to specify how emphasis varies. For example, as logical distance increases from a selected element, emphasis can decrease in an exponential fashion. Equation 2 may be used to determine opacity for decreasing opacity in a exponential fashion.

$$\text{Opacity} = e^{(-k)d} \quad \text{Eq. 2}$$

In equation 2, opacity is a function of logical distance d and a constant k. For example, if k is 0.39, an element a logical distance of 0.5 from the selected element may have an opacity of 82%, while an element a logical distance of 2 from the selected element may have an opacity of 46%. Emphasis can also decrease in a linear fashion, such as according to equation 3.

$$\text{Opacity} = 1 - (k)d \quad \text{Eq. 3}$$

For example, if k is 0.2 in equation 3, each increase in logical distance of 0.5 may result in a fixed 10% decrease in opacity; an element a logical distance of 0.5 from the selected element may have an opacity of 90%, while an element a logical distance of 2 from the selected element may have an opacity of 60%. Emphasis of elements beyond the level of parent elements specified at option 510 and level of child elements specified at option 520 may be set to the minimum threshold opacity. Besides varying emphasis in an exponential or linear fashion, other ways of varying the level of emphasis may be used.

Option 580 may permit a user to specify whether one or more elements may be selected at the same time. For example, the user may wish to compare and/or contrast different portions of a flowchart. Therefore, the user may wish to select two different elements to compare and/or analyze parent and/or child elements related to the selected elements. If multiple elements are selected, the emphasis and de-emphasis may be based on the logical distance from each element to the closest selected element. The user may also specify that only one selection of an element is permitted at a time.

If more than one path is present in a flowchart from an element to the selected element, option 590 may permit a user to specify which path is used to calculate the emphasis. For example, referring to flowchart 300 of FIG. 3, vertex 210-2 is located a logical distance of 2 from vertex 210-2 if the path through vertex 310 is used. However, the logical distance between vertex 210-2 and vertex 210-1 is 3 if the path through vertices 330 and 350 is used. The user may be able to specify in option 590 whether a method that uses a shortest, longest, median, or mean path logical distance is used to calculate the emphasis of the element.

Besides the options presented in configuration utility 500 of FIG. 5, other options may be customized by a user. In some embodiments, some or all of these options may not be customizable by the user or are automatically selected by the software.

Figure 6:
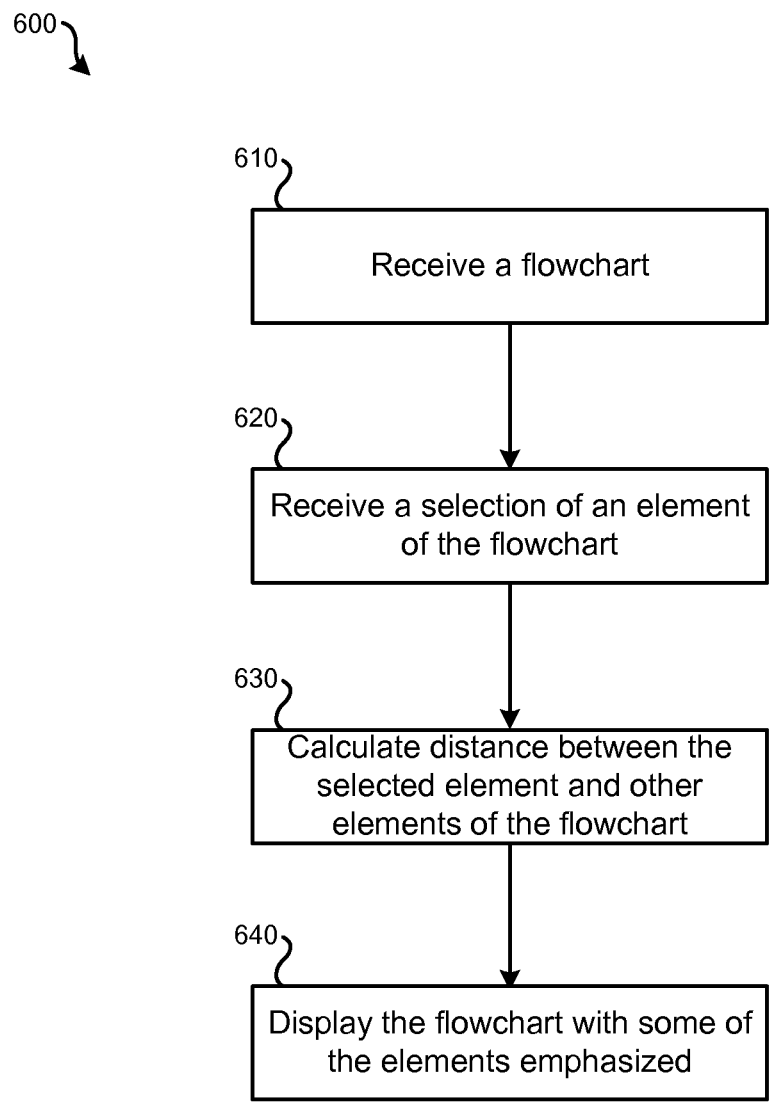
FIG. 6 illustrates an embodiment of a method for simplifying a display of a flowchart.

Various methods may be used to create the emphasis flowcharts of FIGS. 3 and 4. FIG. 6 illustrates an embodiment of a method 600 for displaying a flowchart with some elements emphasized while other elements are deemphasized. Method 600 may be performed using a computer system, such as computer system 800 of FIG. 8. At stage 610, a flowchart may be received. Receiving the flowchart may involve a user or a computer system loading a flowchart on the computer system that is performing method 600. In some embodiments, the flowchart may be created by a piece of software from raw information, such as software generating a flowchart to provide a visual representation of computer code. This flowchart may be exported to another program to be displayed and/or edited and received at stage 610.

At stage 620, a selection of an element of the flowchart may be received. The selection of the element may be received from a user. For example, the user may use a cursor to click on an element that the user wishes to emphasize. In some embodiments, the software may automatically select an element for emphasis. An edge or vertex may be selected.

At stage 630, the logical distance between the selected element and other elements of the flowchart are determined. The logical distance is based on elements that are linked together via an edge. To be clear, referring to FIG. 4, despite vertex 420 being placed close to vertex 380, the logical distance may be measured via vertices 410, 310, 210-2, and 375 because this is the shortest path via vertices and edges. In some embodiments, each element, including both edges and vertices, may count as a logical distance of 0.5. Therefore, two vertices separated by an edge would be a logical distance of 1 from each other. Of course, other values of logical distance can be assigned to each element. Following stage 630, a value for each element of the flowchart may have been calculated. This value may be linked with the corresponding element and may indicate the logical distance between the corresponding element and the element indicated by the selection received at stage 620.

At stage 640, the flowchart may be displayed to the user (such as via a computer display) with some of the elements of the flowchart emphasized. The elements emphasized and deemphasized may be selected based on the logical distance calculations of stage 630. As the logical distance between an element and the selected element increases, the emphasis placed on the element may decrease. For example, the opacity of the element may decrease as the logical distance from the selected element increases. The user may select another element, in which case method 600 may return to stage 620.

Figure 7:
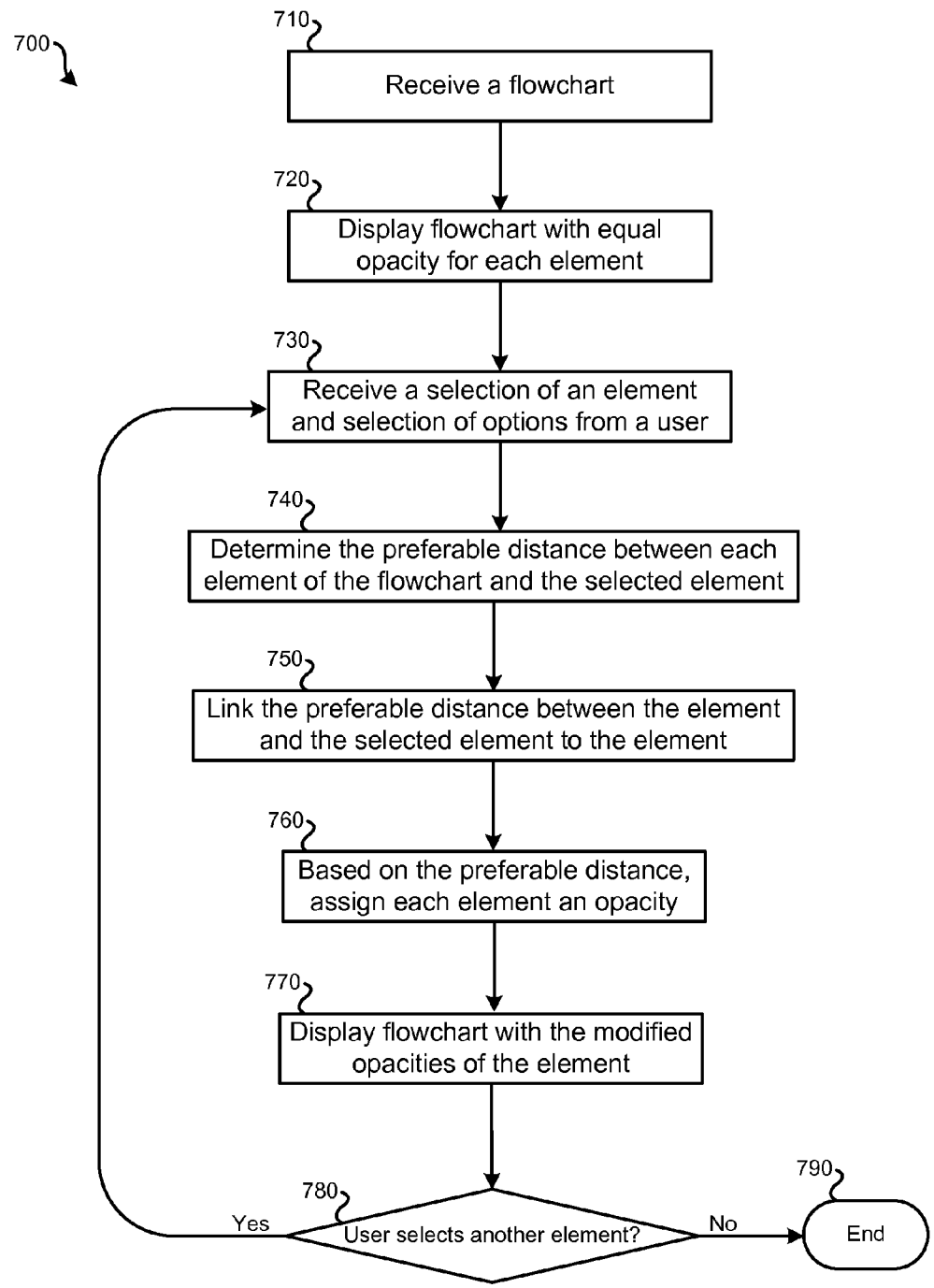
FIG. 7 illustrates another embodiment of a method for simplifying a display of a flowchart.

FIG. 7 illustrates another embodiment of a method 700 for simplifying a display of a flowchart. Method 700 may represent the same method as method 600 of FIG. 6 with additional stages. Method 700 may be performed using a computer system, such as computer system 800 of FIG. 8. At stage 710, a flowchart may be received. Receiving the flowchart may involve a user loading a flowchart on the computer system that is performing method 700. In some embodiments, the flowchart may be created by a piece of software from raw information, such as software generating a flowchart to provide a visual representation of computer code. This flowchart may be exported to another program and/or computer system to be displayed and/or edited.

At stage 720, the flowchart may be displayed to the user. At this point, each element of the flowchart may be displayed with the same level of emphasis. For example, the emphasis of the flowchart may appear similar to that of flowchart 200 of FIG. 2, where each element of the flowchart is equally emphasized. At this point, the user may view the flowchart and identify the portion of the flowchart that the user wishes to focus on.

At stage 730, a selection of an element of the flowchart may be received. The selection of the element may be received from a user. For example, the user may use a cursor to click on an element or type in an identifier of an element that the user wishes to emphasize. In some embodiments, software may automatically select an element for emphasis. Additionally, at stage 730, the user may customize how and what elements of a flowchart are emphasized. For example, a configuration utility, such as configuration utility 500 of FIG. 5, may be presented to the user. In this embodiment of method 700, one element is selected. In other embodiments, multiple elements may be selected.

At stage 740, the preferable logical distance between each element of the flowchart and the selected element may be determined. This may only be necessary for elements for which multiple paths between the element and the selected element exist, such as vertex 210-2 and selected vertex 210-1 of FIG. 3. In some embodiments, the shortest logical distance is the preferable logical distance. In other embodiments, the mean, median, or longest logical distance may be the preferable logical distance between the element and the selected element. Whichever logical distance measurement is preferable, the logical distance may be measured in elements of the flowchart. For example, each element may relate to a logical distance of 0.5. As such, two vertices connected by an edge would be considered a logical distance of 1 apart. Other ways of measuring the logical distances between elements of a flowchart may be used. At stage 750, the preferable logical distance may be linked to the corresponding element and may be at least temporarily stored.

At stage 760, based on the preferable logical distance, each element is assigned a property, such as opacity, to emphasize (or deemphasize) the element. For example, depending on the preferable logical distance, the opacity may be nearly or fully opaque, partially transparent, very transparent, or completely invisible.

At stage 770, the flowchart may be displayed with the modified opacities of the elements. As such, elements near the selected element may appear opaque or near opaque, while elements a logical distance away may appear less opaque. Elements more than a certain logical distance from the selected element may have a minimum threshold opacity such that these elements are deemphasized but are still at least partially visible. At stage 770, the user may view the flowchart. With some elements emphasized and others deemphasized, it may be easier for the user to comprehend the portion of the flowchart closely related to the selected element.

At stage 780, the user may select another element. If so, method 700 may return to stage 730. The method may continue to repeat as long as the user changes the selected element or adjusts options in a configuration utility. If, at stage 780, no other element is selected, the method may end at stage 790.

Figure 8:
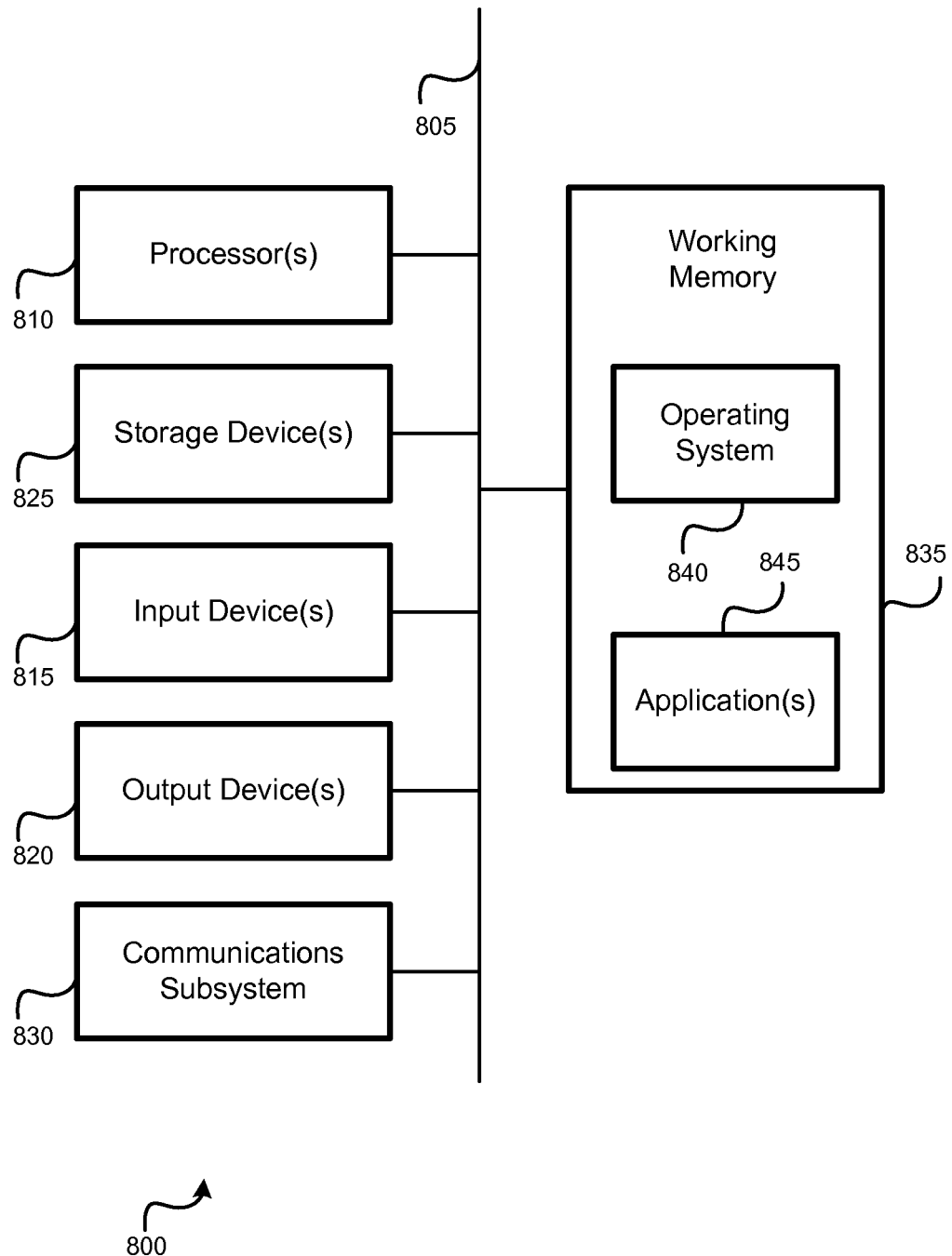
FIG. 8 illustrates an embodiment of a computer system.

FIG. 8 illustrates an embodiment of a computer system. Such a computer system may be used to perform the methods of FIGS. 6 and 7, produce the flowcharts of FIGS. 2-4, and execute the configuration utility of FIG. 5. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard and/or the like; and one or more output devices 820, which can include without limitation a display device, a printer and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 825 described above. In some cases, the storage medium might be incorporated within a computer system, such as the system 800. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 825. Volatile media include, without limitation, dynamic memory, such as the working memory 835. Transmission media include, without limitation, coaxial cables, copper wire and fiber optics, including the wires that comprise the bus 805, as well as the various components of the communication subsystem 830 (and/or the media by which the communications subsystem 830 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

While the above description focuses on flowcharts, other visual representations of data may employ similar methods and systems to emphasize and deemphasize data to make the visual representation of information more comprehensible to a user. For example, similar methods and systems may be used to emphasize and deemphasize data in visual representations of family trees, computer network topologies, etc.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for simplifying a display of a flowchart, the method comprising:
   receiving, by a computer system, the flowchart, wherein:
      the flowchart comprises a plurality of elements; and
      the plurality of elements comprises a plurality of vertices and a plurality of edges;
   receiving, by the computer system, a user-defined threshold level of parent elements and a user-defined threshold level of child elements;
   setting, by the computer system, a threshold logical distance based on the user-defined threshold level of parent elements and the user-defined threshold level of child elements;
   receiving, by the computer system, a selection of an element of the plurality of elements;
   calculating, by the computer system, a logical distance for each element of the plurality of elements, wherein:
      the logical distance for each element of the plurality of elements is between each element and the element of the selection; and
   causing, by the computer system, display of the flowchart with some of the plurality of elements emphasized, wherein:
      the portion of the plurality of elements emphasized are selected at least partially based on the logical distances of the plurality of elements;
      elements of the plurality of elements having logical distances greater than the threshold logical distance are set to a minimum threshold opacity; and
      the user-defined threshold level of parent elements and the user-defined threshold level of child elements are used to define the threshold logical distance.

2. The method of claim 1, wherein causing the display of the flowchart with some of the plurality of elements emphasized further comprises:
   at least partially based on the logical distance for each element of the plurality of elements, setting an opacity for the corresponding element, wherein opacity decreases as logical distance increases from the element identified by the selection.

3. The method of claim 1, further comprising:
   before receiving the selection of the element of the plurality of elements, causing, by the computer system, display of the flowchart with equal emphasis on each of the plurality of elements.

4. The method of claim 1, wherein receiving the selection of the element of the plurality of elements comprises receiving the selection of a vertex from a user.

5. The method of claim 1, wherein receiving the selection of the element of the plurality of elements comprises receiving the selection of an edge from a user.

6. The method of claim 1, wherein calculating the logical distance for each element of the plurality of elements comprises:
   determining a shortest logical distance between each element and the element identified by the selection;
   identifying a number of elements between each element and the element identified by the selection along the shortest logical distance; and
   adding the number of elements between each element and the element identified by the selection along the shortest logical distance to calculate the logical distance.

7. A non-transitory computer program product residing on a processor-readable memory and comprising processor-readable instructions configured to cause a processor to:
   receive a flowchart, wherein:
      the flowchart comprises a plurality of elements; and
      the plurality of elements comprises a plurality of vertices and a plurality of edges;
   receive a user-defined threshold level of parent elements and a user-defined threshold level of child elements;
   set a threshold logical distance based on the user-defined threshold level of parent elements and the user-defined threshold level of child elements
   receive a selection of an element of the plurality of elements;
   calculate a logical distance for each element of the plurality of elements, wherein:
      the logical distance for each element of the plurality of elements is between each element and the element of the selection; and
   cause the flowchart to be displayed with some of the plurality of elements emphasized, wherein:
      the portion of the plurality of elements emphasized is selected at least partially based on the logical distances of the plurality of elements;
      elements of the plurality of elements having logical distances greater than the threshold logical distance are set to a minimum threshold opacity; and
      the user-defined threshold level of parent elements and the user-defined threshold level of child elements are used to define the threshold logical distance.

8. The non-transitory computer program product of claim 7, wherein the processor-readable instructions configured to cause the processor to cause the flowchart to be displayed with some of the plurality of elements emphasized further comprises processor-readable instructions configured to cause the processor to:

at least partially based on the logical distance for each element of the plurality of elements, set an opacity for the corresponding element, wherein:
opacity decreases as logical distance increases from the element identified by the selection.

9. The non-transitory computer program product of claim 7, further comprising processor-readable instructions configured to cause the processor to:
before receiving the selection of the element of the plurality of elements, cause the flowchart to be displayed with equal emphasis on each of the plurality of elements.

10. The non-transitory computer program product of claim 7, wherein the processor-readable instructions configured to receive the selection of the element of the plurality of elements comprises processor-readable instructions configured to receive the selection of a vertex from a user.

11. The non-transitory computer program product of claim 7, wherein the processor-readable instructions configured to receive the selection of the element of the plurality of elements comprises processor-readable instructions configured to receive the selection of an edge from a user.

12. The non-transitory computer program product of claim 7, wherein the processor-readable instructions configured to calculate the logical distance for each element of the plurality of elements further comprises processor-readable instructions configured to cause the processor to:
determine a shortest logical distance between each element and the element identified by the selection;
identify a number of elements between each element and the element identified by the selection along the shortest logical distance; and
add the number of elements between each element and the element identified by the selection along the shortest logical distance to calculate the logical distance.

13. A system for simplifying a display of a flowchart, the system comprising:
a processor; and
a memory communicatively coupled with and readable by the processor and having stored therein a series of instructions which, when executed by the processor, cause the processor to:
receive the flowchart, wherein:
the flowchart comprises a plurality of elements; and
the plurality of elements comprises a plurality of vertices and a plurality of edges;
receive a user-defined threshold level of parent elements and a user-defined threshold level of child elements;
set a threshold logical distance based on the user-defined threshold level of parent elements and the user-defined threshold level of child elements;
receive a selection of an element of the plurality of elements;
calculate a logical distance for each element of the plurality of elements, wherein:
the logical distance is between each element and the element of the selection; and
cause the flowchart to be displayed with some of the plurality of elements emphasized, wherein:
the portion of the plurality of elements emphasized is selected at least partially based on the logical distances of the plurality of elements;
elements of the plurality of elements having logical distances greater than the threshold logical distance are set to a minimum threshold opacity; and
the user-defined threshold level of parent elements and the user-defined threshold level of child elements are used to define the threshold logical distance.

14. The system of claim 13, wherein the series of instructions, when executed by the processor, further cause the processor to:
at least partially based on the logical distance for each element of the plurality of elements, set an opacity for the corresponding element, wherein opacity decreases as logical distance increases from the element of the selection.

15. The system of claim 13, wherein the series of instructions, when executed by the processor, further cause the processor to:
before receiving the selection of the element of the plurality of elements, cause the flowchart to be displayed with equal emphasis on each of the plurality of elements.

16. The system of claim 13, wherein the series of instructions, when executed by the processor, further cause the processor to: receive the selection of an edge from a user.

17. The system of claim 13, wherein the series of instructions, when executed by the processor, further cause the processor to:
determine a shortest logical distance between each element and the element identified by the selection;
identify a number of elements between each element and the element identified by the selection along the shortest logical distance; and
add the number of elements between each element and the element identified by the selection along the shortest logical distance to calculate the logical distance.

* * * * *